(12) United States Patent
Suzuki

(10) Patent No.: US 6,782,434 B1
(45) Date of Patent: Aug. 24, 2004

(54) APPARATUS AND METHOD FOR TRANSFERRING INFORMATION AMONG VARIETY OF INFORMATION RECORDING AND REPRODUCING APPARATUS

(75) Inventor: Ryoichi Suzuki, Yokohama (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 09/448,500

(22) Filed: Nov. 24, 1999

(30) Foreign Application Priority Data

Nov. 26, 1998 (JP) ............................................ 10-336104

(51) Int. Cl.[7] .............................................. G06F 13/00
(52) U.S. Cl. ........................ 710/33; 710/13; 369/47.12; 369/85
(58) Field of Search ............................. 710/31, 33, 2, 710/8, 13; 369/47.12, 85

(56) References Cited

U.S. PATENT DOCUMENTS

| | | | | |
|---|---|---|---|---|
| 4,763,323 A | * | 8/1988 | Nelson et al. ............... 370/449 |
| 5,802,325 A | * | 9/1998 | Le Roux ..................... 710/301 |
| 5,886,957 A | * | 3/1999 | Yokota et al. ............ 369/13.37 |
| 6,084,167 A | * | 7/2000 | Akimoto et al. ........... 84/477 R |
| 6,243,328 B1 | * | 6/2001 | Fenner et al. ............. 707/104.1 |
| 6,369,693 B1 | * | 4/2002 | Gibson ........................ 340/5.8 |
| 6,408,332 B1 | * | 6/2002 | Matsumoto et al. ......... 709/219 |
| 6,470,341 B1 | * | 10/2002 | Rekimoto ..................... 707/10 |

* cited by examiner

*Primary Examiner*—Jeffrey Gaffin
*Assistant Examiner*—Eron Sorrell
(74) *Attorney, Agent, or Firm*—Dickstein Shapiro Morin & Oshinsky LLP

(57) ABSTRACT

An information transfer apparatus includes a casing having at least two sections accommodating a variety of information recording and reproducing apparatuses, respectively. A transfer device is arranged to transfer information from one of the information recording and reproducing apparatuses to the other one or more information recording and reproducing apparatuses. A controller is arranged to control an information transfer operation using information transfer control program realizing an information transfer operation among the variety of information recording and reproducing apparatuses.

16 Claims, 8 Drawing Sheets

APPARATUS AND METHOD FOR TRANSFERRING INFORMATION AMONG VARIETY OF INFORMATION RECORDING AND REPRODUCING APPARATUS

BACKGROUND OF THE INVENTION

1. Field of the Invention

The present invention relates to an information transfer apparatus and method for transferring information among a plurality of information recording and reproducing apparatuses. More particularly, the present invention relates to an information transfer apparatus and method capable of transferring information among a variety of information recording and reproducing apparatuses including an optical disk apparatus, such as a CD-R (Compact Disk-Recordable), a CD-RW (Compact Disk-Rewritable), a DVD-RAM (Digital Versatile-Random Access Memory) and a PD (Phase Change Optical Disk), an optical magnetic disk apparatus, such as a MO (Magnetic Optical Disk), a magnetic disk apparatus, such as a HD (Hard Disk), a FD (Floppy Disk), a LSI (Large Scaled Integrated circuit) and a ZIP (TM), a memory card recording and reproducing apparatus, such as a RAM (Random Access Memory), a ROM (Read Only Memory), an optical memory and a magnetic memory, and a magnetic tape recording and reproducing apparatus.

2. Discussion of the Background

Recently, a variety of recording mediums for recording information are widely used along with a spread of a personal computer and a variety of digital input/output Apparatuses. Further, as shown in the Japanese Patent application Laid Open No. 6-301601 as one example, there exists heretofore an information recording apparatus which stores information inputted from an information providing apparatus in a buffer, and then stores the same in a plurality of the same kind of recording medium pieces having a relatively slower recording speed characteristic so that the information can be recorded in a high speed in the recording medium pieces.

However, as a recording medium diversifies, an information recording and reproducing apparatus installed in computers diversifies correspondingly. Therefore, a kind of the information recording and reproducing apparatus is sometimes different from another, even if the computer adopts the same architecture.

Further, since there are recording mediums of a high price, such as a memory card, and of a low price, such as an optical disk including a CD-R or the like, it is generally required to lower a total cost of storing of information by moving information to a cheaper recording medium. However, there is a difficulty in the conventional information recording apparatus in executing communication of information among different kinds of recording mediums.

SUMMARY

The present invention, therefore, addresses and resolves such problems and provides a novel information transfer apparatus including a casing arranged to include at least two sections accommodating a variety of information recording and reproducing apparatuses, respectively a transfer device may be arranged to transfer information from one of the information recording and reproducing apparatuses to the other, and a controller may be arranged to control an information transfer operation using information transfer control program realizing an information transfer operation among the variety of information recording and reproducing apparatuses.

In another embodiment, a controller may read information transfer program stored in an information recording and reproducing apparatus before a start of the information transfer operation.

In yet another embodiment, a -selecting device may be arranged to select one or more information recording and reproducing apparatuses as information transfer sources, and one or more the other information recording and reproducing apparatuses as information transfer destinations.

In yet another embodiment, the selecting device may select one or more information recording and reproducing apparatuses in a prescribed priority order.

In yet another embodiment, a priority may be given to a most frequently utilized information recording and reproducing apparatus as an information transfer source.

In yet another embodiment, a recording medium existence determining device may be arranged to determine if a recording medium having information to be transferred exists in the information recording and reproducing apparatus as a supposed information transfer source.

In yet another embodiment, another recording medium existence determining device may be arranged to determine if a recording medium recording information therein exists in the information recording and reproducing apparatus as a supposed information transfer destination.

In yet another embodiment, an information transfer completion determining device may be arranged to determine completion of the information transfer operation.

In yet another embodiment, a replacement instructing device may be arranged to instruct a replacement of the prescribed information recording and reproducing apparatus, if it does not includes the information transfer program.

In yet another embodiment, a plurality of ports may be arranged to connect with a host computer, a printer, and the other external digital input/output instruments.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTON OF THE PREFERRED EMBODIMENTS

Hereinbelow, preferred embodiments of the present invention are described referring to the several accompanying drawings. Like numerical numbers and marks indicate the same or corresponding parts in several views throughout the drawings.

Figure 2:
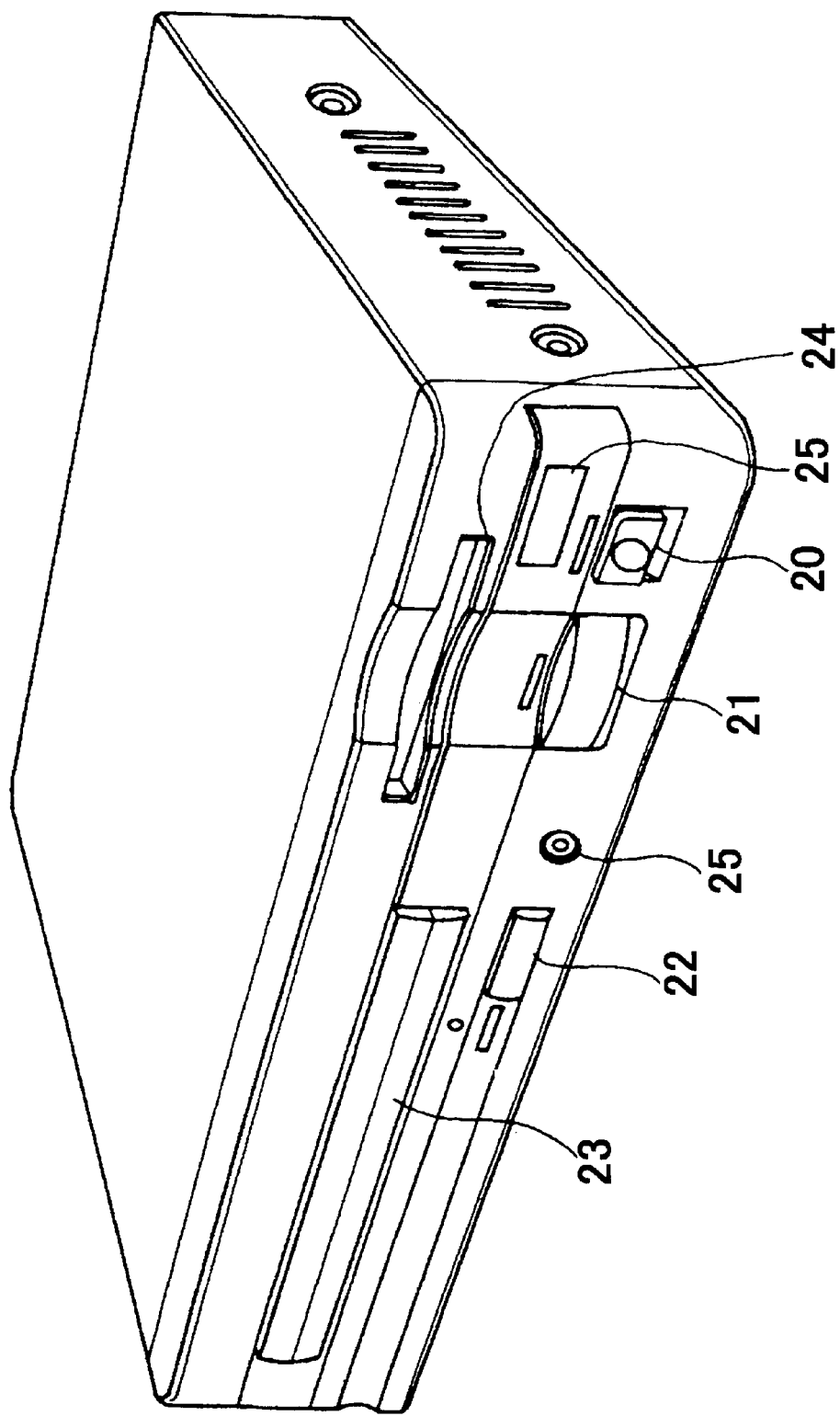
FIG. 2 is an exterior schematic perspective view of the information transfer apparatus illustrated in FIG. 1 when viewed from a front side thereof.

FIG. 2 is an exterior perspective view of one exemplary information transfer apparatus according to the present invention when viewed from a front side thereof. The information transfer apparatus may accommodate an optical disk drive and a memory card drive in a single casing. The information transfer apparatus may include a plurality of switches on its front panel. For example, an starting switch 20 for starting the apparatus, a transfer start instructing switch 21 for instructing a start of a transfer of information, and a withdrawal/installing switch 22 for withdrawing and installing an optical disk are provided thereon.

The optical disk, such as a CD-R/RW (Compact Disk-Recordable/Rewritable), may be installed through an optical disk installing tray 23 and a memory card (not shown) may be installed through a memory card inserting inlet 24, as an information recording medium, respectively. An audio inputting terminal 25 may be provided and connects with a microphone and an audio instrument. An infrared rays receiving section 26 may be provided and receives infrared rays signals indicating a variety of operations, which are generated by and emitted from a remote controlling apparatus.

The remote controlling apparatus may include a selection key (no shown) capable of selectively inputting one or more numbers allocated to each of information recording and reproducing apparatuses connected to the information transfer apparatus to select one or more information recording and reproducing apparatuses as information transfer sources and that of an information transfer destinations.

Figure 3:
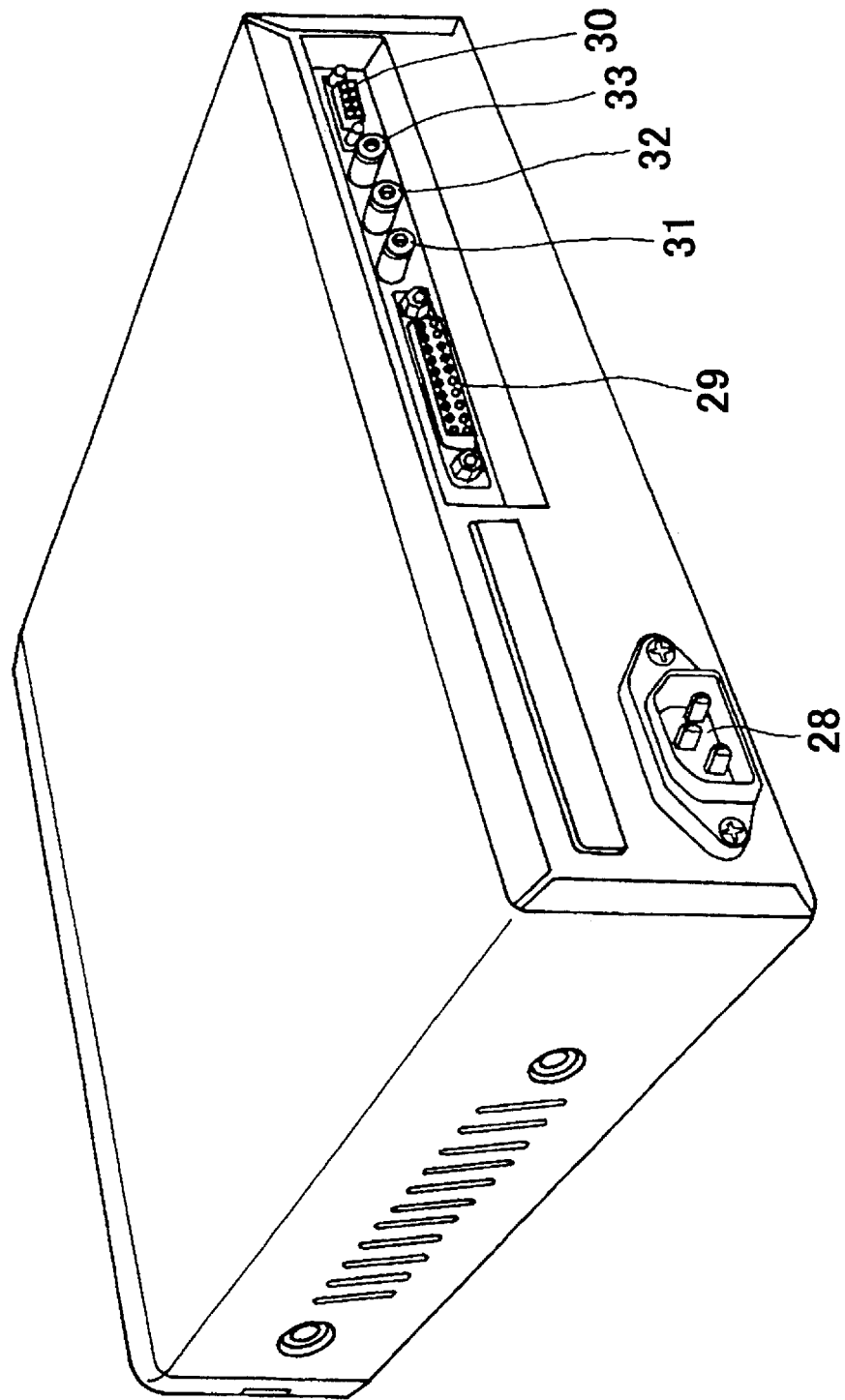
FIG. 3 is an exterior schematic perspective view of the information transfer apparatus illustrated in FIG. 1 when viewed from a rear side thereof.

FIG. 3 is an exterior perspective view of the exemplary information transfer apparatus when viewed from a rear side thereof. A socket 28 for connecting with electric power source, a parallel port 29 connecting with an external instrument, such as a printer (not shown), and a serial port 30 connecting with other digital input/output instruments (not shown) may be disposed. Further, a plurality of stereo audio output terminals 31 and 32, and a video image output terminal 33 or the like may be also disposed.

Figure 4:
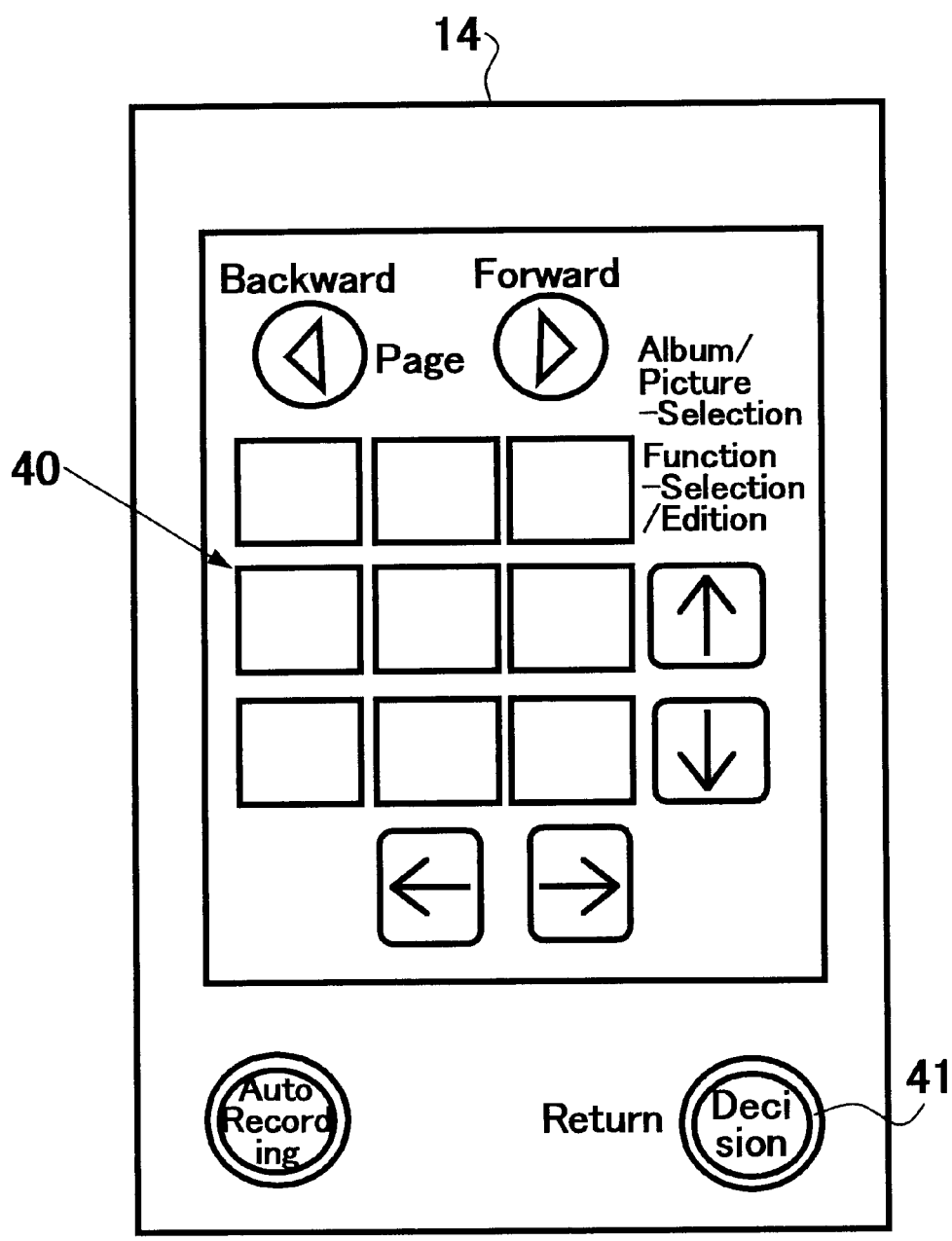
FIG. 4 is a plan view of a remote controlling apparatus used in the information transfer apparatus illustrated in FIG. 1.

FIG. 4 illustrates a remote controlling apparatus utilized with the above noted information transfer apparatus. The remote controlling apparatus 14 may correspond to a remote controlling device for remotely instructing an information transfer start operation and a selecting operation for selecting an information recording and reproducing apparatus as an information transfer source and that of an information transfer destination using an infrared rays signals. To this end, a section key 40 for selectively inputting numbers 1 through 9 and a decision key 41 for instructing an information transfer start or the like may be included therein. The above noted selection key 40 may function as a key for selectively inputting a number allocated to all information recording and reproducing apparatuses connected to the information transfer apparatus to select an information transfer source and one or more information transfer destinations of the information recording and reproducing apparatuses.

Figure 1:
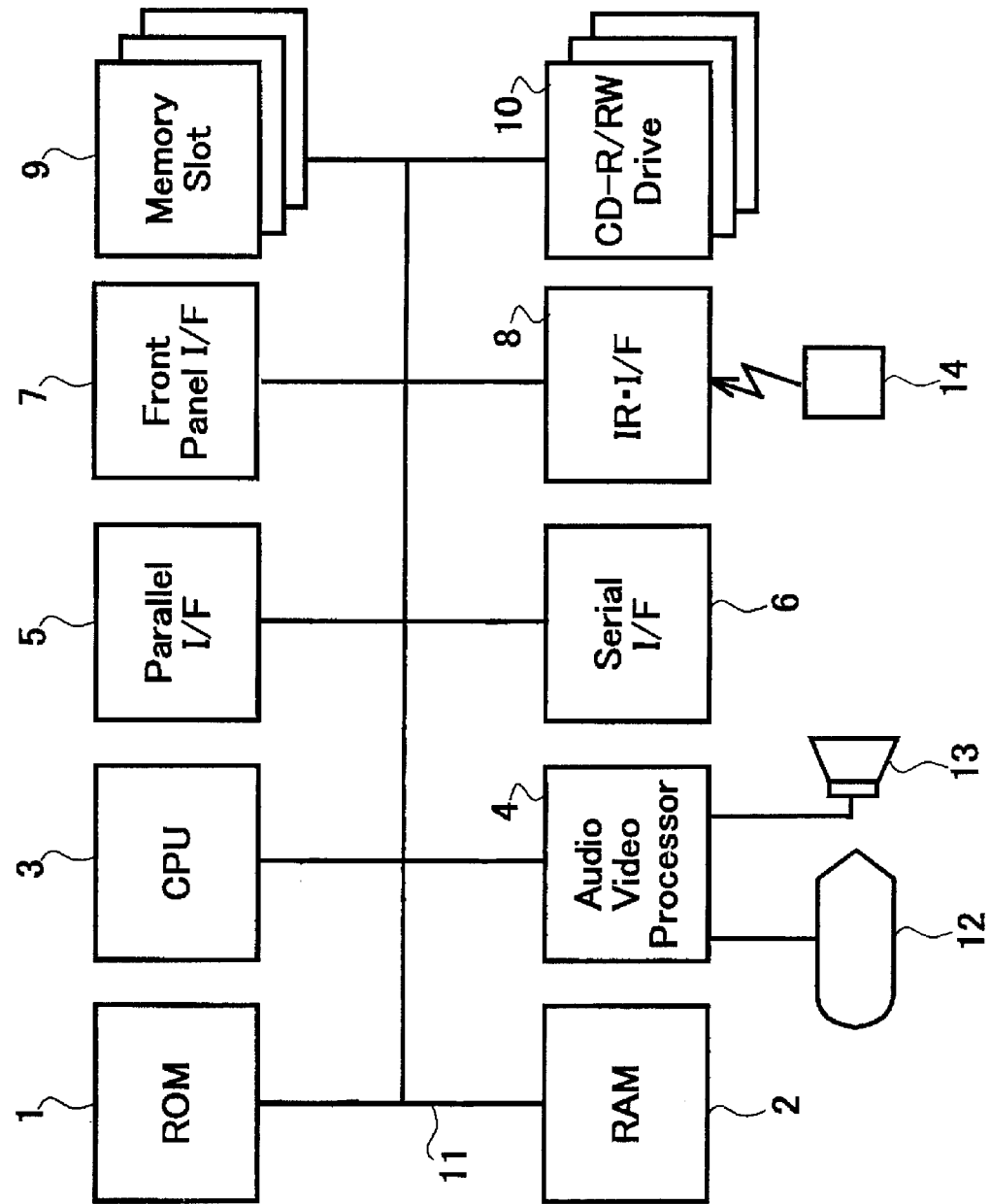
FIG. 1 is a block chart showing an internal constitution of one exemplary information transfer apparatus according to the present invention.

FIG. 1 is a block chart illustrating an interior constitution of the exemplary information transfer apparatus according to the present invention. The information transfer apparatus may be realized by a microcomputer as explained later. A ROM 1 may be a read only memory and may store a variety of control program for the apparatus and processing program for realizing a variety of functions relating to the present invention. It is preferable to utilize a rewritable non-volatile memory as far as it includes minimum start up program.

A RAM 2 may be provided and is utilized when a CPU (central control unit) 3 performs a variety of processing operations. Such a RAM 2 may be a readable and writable memory and temporally stores and arranges a variety of information, such as information to be transferred, information to be used for converting a format, information of a work area of program. The CPU 3 may execute an entire control of the information recording and reproducing apparatus and a variety of processes relating to the present invention.

An audio video processor 4 may be provided and may execute audio and image processes. Such an audio video processor 4 may display contents of transferred information, a result of a transfer operation, a progressing condition of the transfer operation, and a condition of the apparatus on a displaying apparatus 12 such as a display and a television, or may generate a sound indicating those conditions or the like through a speaker 13. Further, the audio video processor 4 can input and record the sound in the information recording and reproducing apparatus.

A parallel interface (herein after referred to as an I/F) 5 may control mainly information communications with a printer (not shown) connected through the parallel port 29. The parallel IF 5 can connect with other similar instrument and a host computer. A serial interface (IF) 6 may connect with many digital input/output instruments (not shown) through a serial port, and may control information communications with those instruments. Further, it can connect with the host computer.

A front panel interface (IF) 7 may control an inputting operation of a variety of switches, such as a transfer start instructing switch 21, and a lightening operation of a LED (Light Emitting Diode) or the like. An input instruction may be received from the front panel interface (IF) 7, and it is capable of informing a result of a transfer, a progressing condition, an apparatus condition, and an operation result or the like, for example by blinking the LED. An infrared rays interface (hereinafter referred to as an IR/IF) 8 may be provided, and may control transmitting and receiving operations of an infrared rays signal to and from the above noted remote controlling apparatus 14. When the remote controlling apparatus 14 employs a wired construction, the IR/IF 8 may then role an interface for the wired remote controlling apparatus. A memory slot 9 may be formed, and detachably accommodate a memory card (not shown) as a mobile recording medium through a memory card inserting inlet 24. A CD-R/RW drive 10 may also accommodate a recording medium, such as a CD-R/RW medium, through an optical disk installing tray 23, and read and write information.

A plurality of memory slots 9 and CD-R/RW drives 10 can be utilized, and other kinds of an information recording and reproducing apparatus can be also utilized. If a magnetic disk apparatus is employed, a higher reading and writing operation can be obtained. A bus 11 may role a communication line for communicating information among the above noted sections.

Namely, the parallel IF 5, the serial IF 6, and the bus 11 or the like may function as a connecting device for connecting a plurality of different kinds of the information recording and reproducing apparatuses. The CPU 3, the front panel IF 7, and the remote controlling apparatus 14 may function as a selecting device for selecting only one information recording and reproducing apparatus as an information transfer source and that of an information transfer destination among the information recording and reproducing apparatuses connected to the above noted connecting device. Further, the CPU 3 or the like may function as a transfer device for transferring information stored in the recording medium of the information recording and reproducing apparatus of the information transfer source to that of the information transfer destination.

Further, the CPU 3, the front panel IF 7, and the remote controlling apparatus 14 may function as a selecting device for selecting one of information recording and reproducing apparatuses as an information transfer source among the information recording and reproducing apparatuses connected to the above noted connecting device. The CPU 3 or the like may function as a transfer device for transferring information stored in the recording medium of the information recording and reproducing apparatus of the information transfer source, which is selected by the selecting device, to all the other information recording and reproducing apparatuses.

Further, the CPU 3, the front panel IF 7, and the remote controlling apparatus 14 may also function as a selecting device for selecting one of information recording and reproducing apparatuses as an information transfer source among the information recording and reproducing apparatuses connected to the above noted connecting device, and selecting a plurality of information recording and reproducing apparatuses as information transfer destinations. The CPU 3 or the like may also function as a transfer device for transferring information in the recording medium of the information recording and reproducing apparatus of the information transfer source, which is selected by the selecting device, to all the other information recording and reproducing apparatuses of the information transfer destinations.

Further, the remote controlling apparatus 14 may correspond to the transfer start remote controlling device for remotely instructing the above noted transfer device to start an information transfer operation. Further, the CPU 3, the parallel IF 5, the serial IF 6, and the bus 11 or the like may function as a reading device for reading information transfer control program realizing the above noted function of the transfer device from the recording medium of the information recording and reproducing apparatus connected to the connecting device.

Further, the CPU 3, the audio and video processor 4, the displaying apparatus 12, and the speaker 13 or the like may function as an outputting device for outputting a status of an information transferring operation executed by the transfer device and a status of an information recording operation executed by the information recording and reproducing apparatus of the information transfer destination or the like.

An information transfer process executed in the image transfer apparatus and a reading process for reading control program executing the information transfer process therein, are now explained. An information transfer process to be executed between the memory card installed in the memory slot 9 and the CD-R disk or the CD-RW disk installed in the CD-R/RW drive 10 may be explained in this image transfer process as one example.

Figure 5:
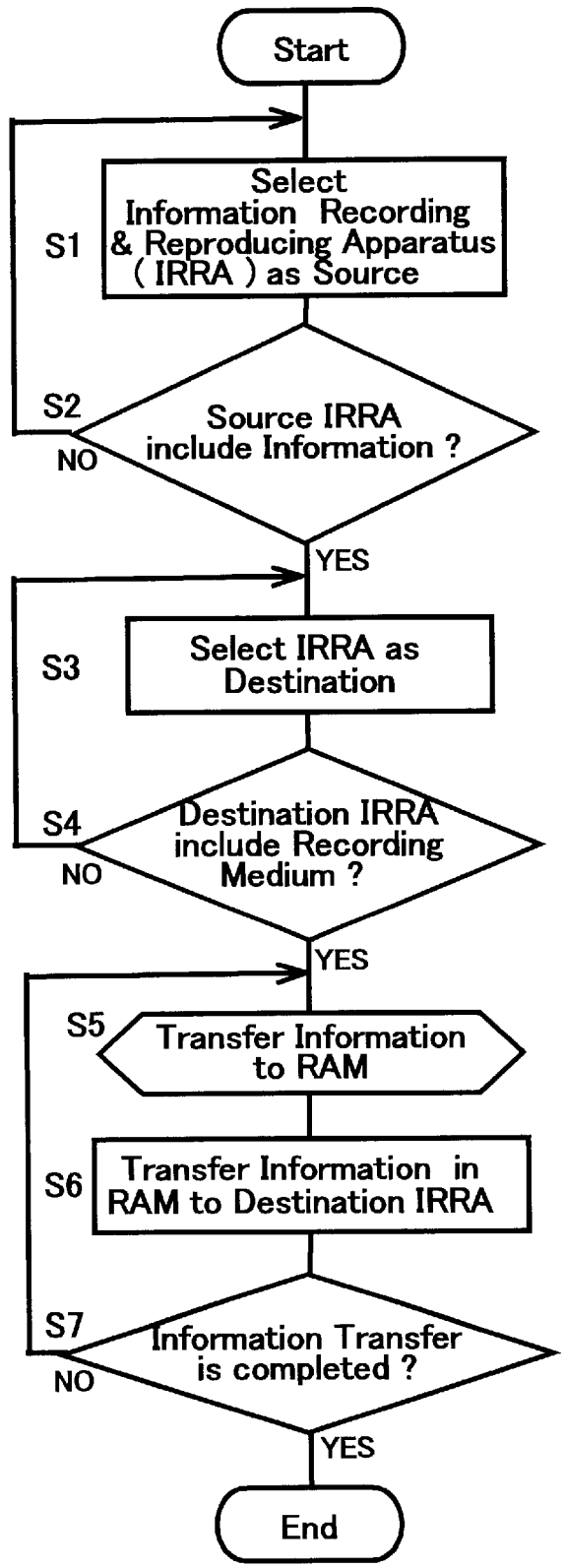
FIG. 5 is a flowchart showing a process for executing an information transfer operation from one of information recording and reproducing apparatuses illustrated in FIG. 1 to a different kind of a single information recording and reproducing apparatus.

First, a process to be executed when some information is transferred from one of information recording and reproducing apparatuses (i.e., the memory card) to another different kind of information recording and reproducing apparatus (i.e., the CD-R disk or the CD-RW disk) is explained referring to FIG. 5. Initially, one of information recording and reproducing apparatuses may be selected as an information transfer source based on a number inputted through the remote controlling apparatus 14 or the front panel.

Namely, one of the information recording and reproducing apparatuses having a recording medium in which transfer desired information is recorded may be selected (Step S-1). Otherwise, one of information recording and reproducing apparatuses may be selected as an information transfer source among the plurality of information recording and reproducing apparatuses connected to the information transfer apparatus based on a predetermined priority. Because, information stored in the memory card, for example, of a digital camera is most frequently transferred to the CD-R/DR, and accordingly it is convenient to give an information transfer priority thereto. To this end, such an option can be set as default.

Secondly, it is determined if the recording medium of the information recording and reproducing apparatus of the information transfer source includes information to be transferred (Step S-2). In this determining process, existence of the information may typically be confirmed by detecting existence of an electronic file therein.

If the information does not exist in the recording medium of the information recording and reproducing apparatus of the information transfer source in step S-2 (i.e., No), a selecting process is executed over again in step S-1. If the information exists therein (i.e., Yes in step S-2), one of the information recording and reproducing apparatuses may be selected as an information transfer destination based on the number input from the front panel or the remote controlling apparatus 14 (step S-3). Otherwise, one of the information recording and reproducing apparatuses may be selected as an information transfer destination among the plurality of information recording and reproducing apparatuses connected to the information transfer apparatus based on a predetermined priority.

If a selecting input for selecting the information transfer destination is completed in step S-3, it is then determined if a recording medium for recording information exists in the information transfer destination (Step S-4). If it is determined that the recording medium does not exist in Step S-4 (i.e., No), the selecting process for selecting an information recording and reproducing apparatus of an information transfer destination is executed over again in step S-3.

When the selection of a couple of the information transfer source and the information transfer destination of the information recording and reproducing apparatuses is completed in the above mentioned process, an information transfer is started through the bus in response to a depressing operation of the transfer start instruction switch 21 of the front panel or the decision key 41 of the remote controlling apparatus 14.

At this stage, there is generally a difference in reproducing speed and recording speed between information recording and reproducing apparatuses. Therefore, the information read from the information transfer source may be transferred to and temporally stored in the RAM (step S-6), and then transferred to the information transfer destination (step S-6), so that the recording process is not left undone. Because, the RAM generally operates at higher speed than the information recording and reproducing device. It is then determined if the information transfer operation is completed in step S-7.

If capacity of the RAM is relatively smaller than an information transfer amount, an information reproducing operation, namely an information reading and storing operations into the RAM, currently executed in the information transfer source may be temporally stopped, and is restarted after a prescribe amount of an information recording operation for the information transfer destination has been completed. These operations are repeated until all information has been transferred (steps S-5 through S-7). If it is determined that all information have been transferred in step S-7 (i.e., Yes), the above mentioned information transfer process is finished.

To confirm a precise recordation, it is preferable that the same amount of information is read from each information transfer source and the information transfer destination information recording and reproducing apparatus, and is compared with the other in the above mentioned information transfer process. It may be determined that the precise recordation is executed, if both contents of the information coincident with each other.

Further, if messages informing a completion of the information transfer operation are outputted, for example, by lightening the LED, displaying an image on the displaying apparatus 12, and outputting a sound from the speaker 13, it is easy to be recognized.

Figure 6:
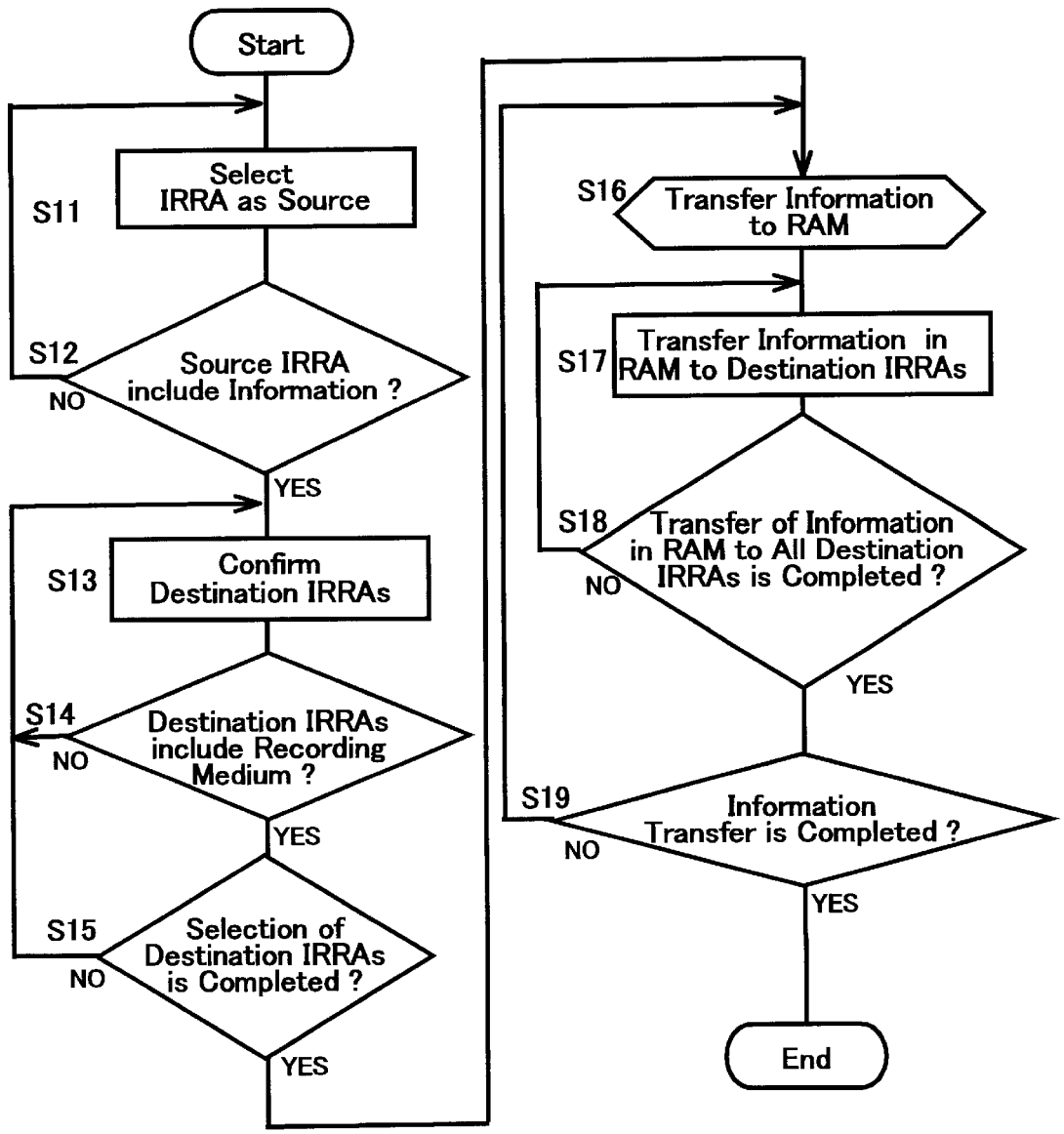
FIG. 6 is a flowchart showing a process for executing an information transfer operation from one of information recording and reproducing apparatuses illustrated in FIG. 1 to all the other information recording and reproducing apparatuses.

A process for transferring information from one of information recording and reproducing Apparatuses to all the other information recording and reproducing Apparatuses is now explained referring to FIG. 6.

Initially, one of information recording and reproducing apparatuses may be selected as an information transfer source based on a number inputted through the remote controlling apparatus 14 or the front panel (Step S-11). Namely, one of the information recording and reproducing apparatuses having a recording medium, in which transfer desired information is recorded, may be selected. Otherwise, one of information recording and reproducing apparatuses may be selected as an information transfer source among the plurality of information recording and reproducing apparatuses connected to the information transfer apparatus based on a predetermined priority.

Secondly, it is determined if the recording medium of the information transfer source includes information to be transferred (Step S-12). As noted earlier, existence of the information may be typically confirmed by detecting existence of an electronic file therein.

If the information does not exist in the recording medium of the information transfer source in step S-12 (i.e., No), the process returns to step 11 to execute a selection operation of information transfer source of an information recording and reproducing apparatus. If the information exists in the recording medium of the information transfer source in step S-12 (i.e., Yes), all the other information recording and reproducing apparatuses are confirmed (step S13), and it is determined if each information transfer destinations includes a recording medium (step S-14). If the recording medium is included therein (i.e., Yes I step S-14), each information recording and reproducing apparatus is selected as an information transfer destination. After that, it is determined if the selection of the information transfer destinations is completed (step S-15).

Since information can not be recorded if no recording medium exists, such an information recording and reproducing apparatus is excluded from an object as an information transfer destination. Accordingly, the above noted confirming process is repeated against all the other remaining information recording and reproducing apparatuses connected to the information transfer apparatus at the case (steps S-13 to S-15).

When it is determined that the selection of an information transfer source and one or more information transfer destinations of information recording and reproducing apparatuses is completed in step S-15, an information transfer is started through the bus in response to a depressing operation of the transfer start instruction switch 21 or the decision key 41.

As noted earlier, there is generally a difference in reproducing speed and recording speed between information recording and reproducing apparatuses. Therefore, information read from the information transfer source may be transferred to and temporally stored in the RAM (step S-16), and then transferred to all the other information recording and reproducing apparatuses (step S-17).

It is then determined if the information transfer operations of the information in the RAM to all the other information transfer destinations are completed in step S-18. If the information transfer operations are not completed (i.e., No in step S-18), the information transfer process for transferring information to the information transfer destinations is repeated (step S-17). When transfer of the information stored in the RAM to all the other selected information recording and reproducing apparatuses is completed (i.e., Yes in step S-18), it is determined if the information transfer operations are completed (step S-19). The end of the information transfer can be recognized, because an amount of information to be transferred from a recording medium may be predetermined and an information recording and reproducing apparatus may recognize the amount, and accordingly, it can generate an end signal indicating completion of information transfer when the predetermined amount is transferred.

If capacity of the RAM is relatively smaller than an information transfer amount, a reproducing operation, namely an information reading and storing operations into the RAM, currently executed in the information transfer source may be temporally stopped, and is restarted after a prescribed amount of information recording operations into the information transfer destination is completed. These operations are repeated until all information has been transferred to all the other information transfer destinations (steps S-16 through S-19). If it is determined that all information have been transferred to all the other information transfer destinations in step S-19, the above mentioned information transfer process is finished.

To confirm precise recordation, it is preferable that the same amount of information are read from both the information transfer source and the information transfer destination and are compared with each other in the above mentioned information transfer process for the same reason as noted earlier. Further, if messages informing a completion of an information transfer operation are outputted, for example, by lightening the LED, displaying an image on the displaying apparatus 12, and outputting a sound from the speaker 13, it may be easy to be recognized.

Figure 7:
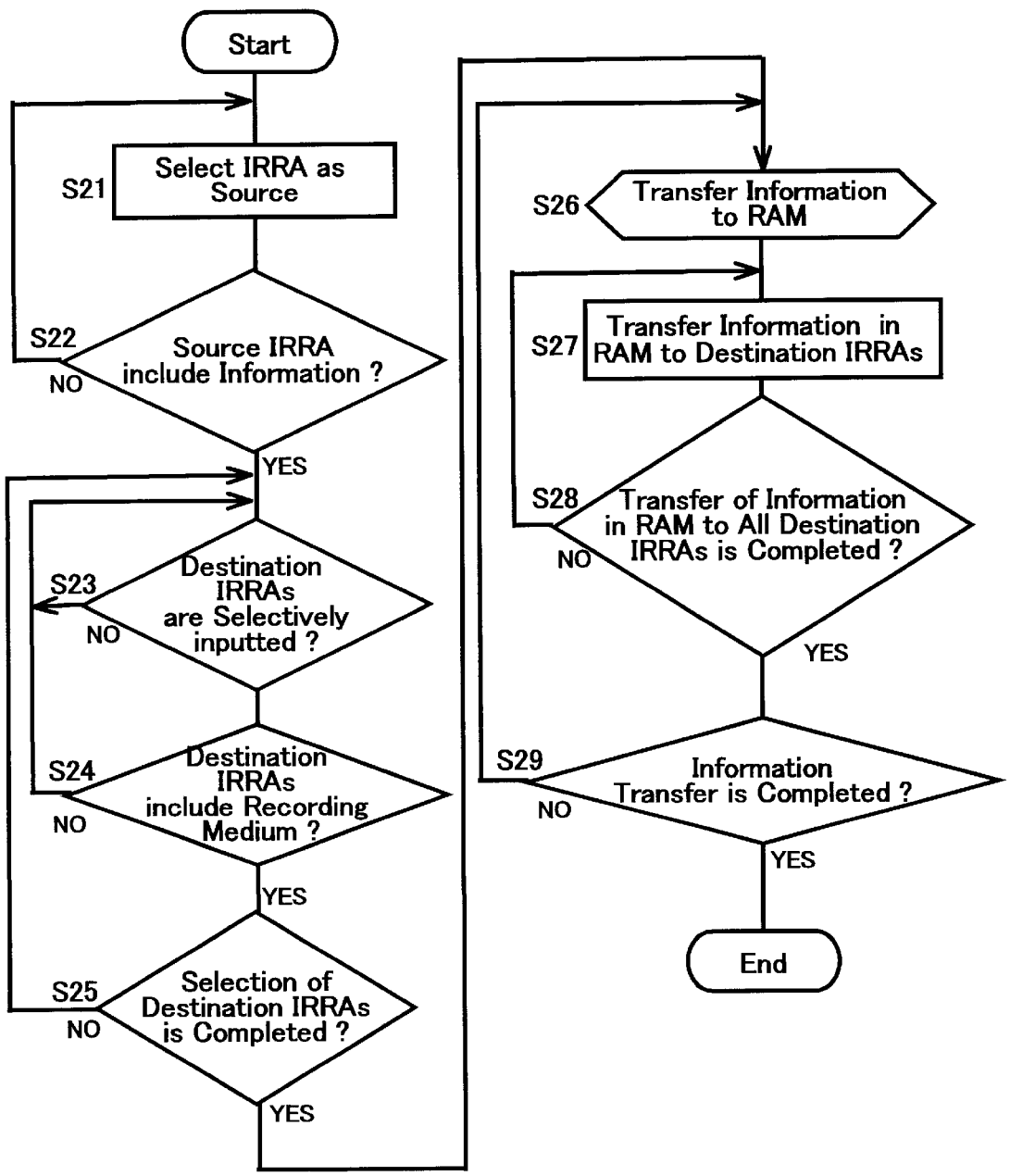
FIG. 7 is a flowchart showing a process for executing an information transfer operation from one of information recording and reproducing apparatuses illustrated in FIG. 1 to a plurality of optionally selected other information recording and reproducing apparatuses.

A process for transferring information from one of information recording and reproducing Apparatuses to a plurality of optionally selected information recording and reproducing apparatuses is now described referring to FIG. 7. Initially, one of information recording and reproducing apparatuses may be selected as an information transfer source based on a number inputted through the remote controlling apparatus 14 or the front panel in the same manner as noted earlier. Namely, one of the information recording and reproducing apparatuses having a recording medium, in which transfer desired information is recorded, may be selected (Step S-21). Otherwise, one of information recording and reproducing apparatuses may be selected as an information transfer source among the plurality of information recording and reproducing apparatuses connected to the information transfer apparatus based on a predetermined priority for the same reason as noted earlier.

Secondly, it is determined if the recording medium of the information transfer source includes information to be transferred (Step S-22). As noted earlier, this determination can typically be executed by detecting existence of an electronic file therein.

If the information to be transferred does not exist in the recording medium of the information transfer source (i.e., No, in step S-12), a selection operation of an information recording and reproducing apparatus as an information transfer source is executed over again in step 21. If the information exists in the recording medium thereof (i.e., Yes, in step S-12), it is determined if there exists a plurality of selection inputs indicating information recording and reproducing apparatuses as information transfer destinations, which is inputted using a number through the front panel or the control apparatus 14 (step S-23).

If it is determined that the selection input operation is not executed in step S-23 (i.e., No), a selecting operation is waited. If it is determined that the selection input operation is executed in step S-23 (i.e., Yes), it is then determined if information recording and reproducing apparatuses corresponding to selectively inputted numbers include recording mediums respectively (step S-24).

Since information is impossible to be recorded if no recording medium exists in the information transfer destination information recording and reproducing apparatus, such an information recording and reproducing apparatus is excluded from an object as an information transfer destination. It is then determined if a selecting operation for selecting information transfer destinations is completed (step S-25).

When it is determined that a plurality of information transfer destinations is optionally selected in step S-25 (i.e., Yes), an information transfer operation is started through the bus in response to a depressing operation of the transfer start instruction switch 21 or the start and cancel key 41 in step S-26. As note earlier, there is generally a difference in reproducing speed and recording speed between information recording and reproducing apparatuses. Therefore, information read from the information transfer source may be transferred to and temporally stored in the RAM (step S-26), and then transferred to the other information transfer destinations (step S-27), so that the recording process is not left undone. It is then determined if a transfer operation for transferring the information from the RAM to the entire selected information transfer destinations is completed (step S-28). Further, if the information transfer operation is finished is determined (step S-29)

If capacity of the RAM is relatively smaller than an information transfer amount, a reproducing operation, namely an information reading and storing operation into the RAM, currently executed in the information transfer source may be temporally stopped, and is restarted after an information recording operation to an information transfer destination has been completed for the same reason as noted earlier. These operations are repeated until all information has been transferred to the entire selected information recording and reproducing apparatuses (steps S-26 through S-29). If it is determined that all information has been transferred to the entire information recording and reproducing apparatuses in step S-29 (i.e., Yes), the above mentioned information transfer process is completed.

To confirm precise recordation, it is preferable that the same amount of information are read from the information transfer source and the information transfer destination, and are compared with each other in the above mentioned information transfer process. Further, if messages informing a completion of an information transfer operation can be outputted, for example, by lightening the LED, displaying an image on the displaying apparatus 12, and outputting a sound from the speaker 13, it may be easy to be recognized.

Figure 8:
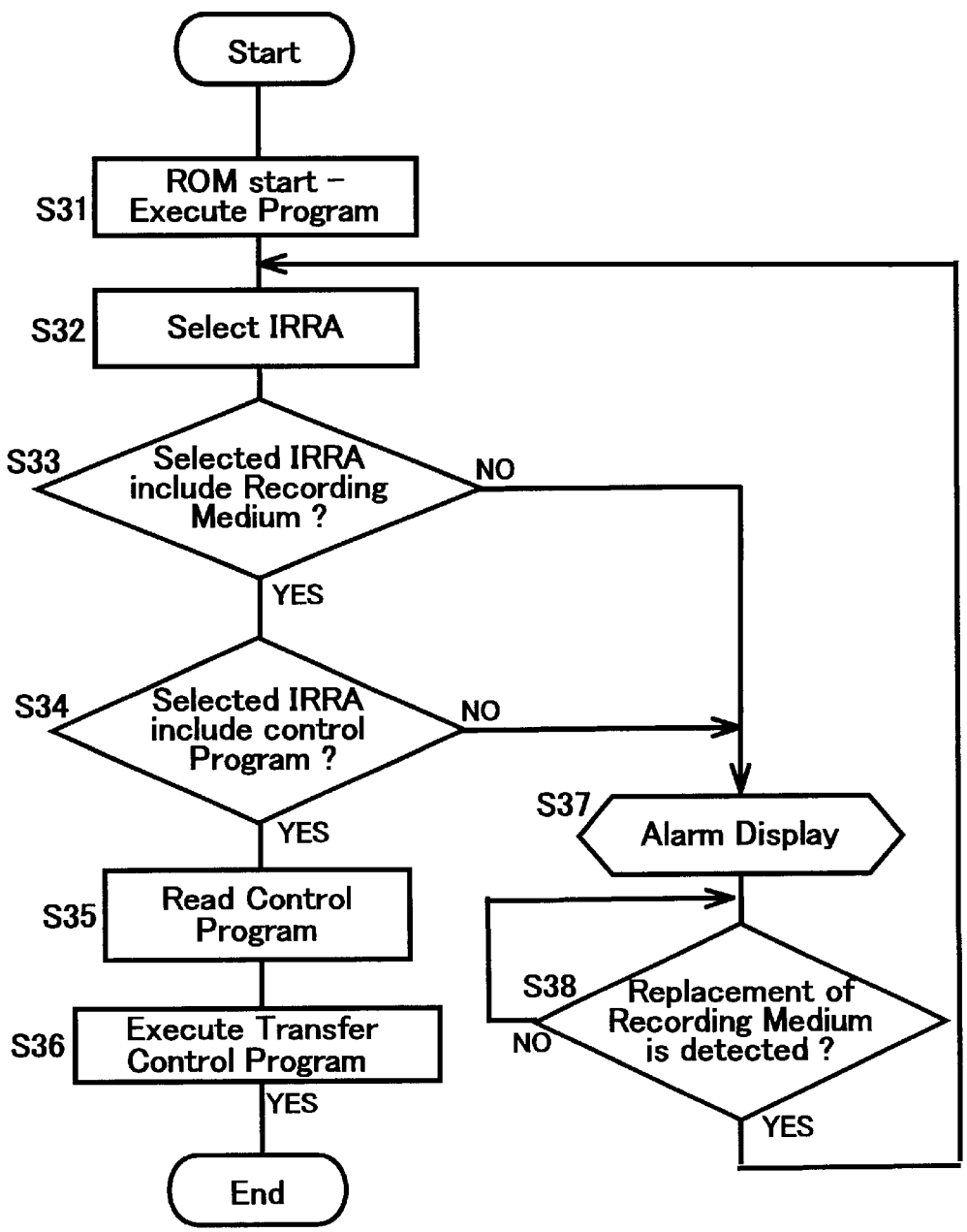
FIG. 8 is a flowchart showing a process for reading control program executing an information transfer process from an information recording and reproducing apparatus illustrated in FIG. 1.

A process for reading control program, which executes an information transfer process, from an information recording and reproducing apparatus is now described referring to FIG. 8.

When the information transfer apparatus starts, the CPU 3 also starts and executes start up program installed in the ROM 1 (step S-31). As the start up program is executed, one of information recording and reproducing apparatuses having a recording medium may be selected among the information recording and reproducing apparatuses connected to the information transfer apparatus based on a predetermined priority in the same manner as noted earlier (step S-32).

After that, it is determined if the selected information recording and reproducing apparatus includes the recording medium (step S-33). If the selected information recording and reproducing apparatus includes a recording medium (i.e., Yes in step s-33), it is then determined if control program executing a control of an information transfer process is stored in the recording medium (step S-34).

If it is determined that the control program is stored in the recording medium (i.e., Yes in step S-34), the control program is read therefrom and stored in the RAM 2 (step S-35). Further, the program in the ROM 2 is executed when the reading and storing operation is completed (step S-36). Thus, the start up program executes above noted process, and after that, the control program read and stored in the RAM may execute a new control of information transfer processes. The new control may be adopted, for example when a format of the same recording medium is changed, when a new information recording medium in a new format is employed, and when a performance of a format of the information recording medium is improved.

If it is determined that neither the recording medium exists in the information recording and reproducing apparatus selected in step S-33, nor the control program exists in the recording medium of the selected information recording and reproducing apparatus in step S-34, an alarm messages indicating such conditions may be displayed (step S-37). The alarm messages are displayed on the LED and the display through the video processor so that a new recording medium having information control program is newly installed by a user.

Further, it is determined if a replacement of the recording medium is detected (step S-38), and a replacement is waited if it has not been detected. If the replacement thereof is detected in step S-38 (i.e., Yes), the process returns to step S-32 to execute a selecting operation for selecting an information recording and reproducing apparatus over again.

Thus, the above noted exemplary information transfer apparatus may handle different kinds of replaceable recording medium without help of a host computer, a plurality of interfaces, a hard disk, and an operation system therefor, which are utilized here to fore. Further, it may move information from a high cost recording medium to a low cost one.

The above noted recording medium and the information recording and reproducing apparatus may be realized by those conventionally used in a personal computer. Further, as note above, information transfer progressing condition may be monitored on a television and a display or the like. The above noted information transfer apparatus may handle mediums of different formats (e.g., Windows or Mac in a floppy disk) by reading and executing a control program executing an information transfer operation control, and correspond to a new medium made in a newly developed format, which is not expected at the beginning of development of the information recording and reproducing apparatus, by using a prescribed software.

Further, program may be made to satisfy needs of a user. To this end, prescribed display control program and input/output control program can be read beside the information transfer operation control program. Thus, it can be readily customized.

Even though, an information transfer operation among the information recording and reproducing apparatuses is explained when those apparatuses are installed and connected to the information transfer apparatus, substantially the same information transfer process may be executed among those apparatuses connecting with the parallel port or the serial port.

Further, if a plurality of information recording and reproducing apparatuses as information transfer sources is selected in the above noted information transfer apparatus, information in a recording medium of each information recording and reproducing apparatus may be transferred to one or more other information recording and reproducing apparatus.

Obviously, numerous modifications and variations of the present invention are possible in light of the above teachings. It is therefore to be understood that within the scope of the appended claims, the present invention may be practiced otherwise than as specifically described therein. This document is based upon the Japanese Patent application No. 10-336104, filed on Nov. 26, 1998, and the entire contents thereof are hereby incorporated by reference.

What is claimed is:

1. An information transfer apparatus, comprising:
    a casing configured to include at least two sections accommodating a plurality of different information recording and reproducing apparatuses; respectively;
    a transfer device configured to transfer information from one of the information recording and reproducing apparatus to the other; and
    a controller configured to control an information transfer operation using an information transfer control program realizing an information transfer operation among the variety of information recording and reproducing apparatuses;
    wherein before a start of the information transfer operation, said controller reads an information transfer program from an information recording and reproducing medium and stores the same in a RAM included in the information transfer apparatus only when said controller determines that such an information transfer program is present in the information recording and reproducing medium; and said information transfer program in said RAM is executed by the controller of the information transfer apparatus when information from an information recording and reproducing medium serving as an information transfer source is transferred to another information recording and reproducing medium.

2. An information transfer apparatus as claimed in claim 1, further comprising a memory configured to temporally store information read from one of the information recording and reproducing apparatuses when the information is transferred.

3. An information transfer apparatus as claimed in claim 1, wherein said variety of information recording and reproducing apparatuses include those which share a same type of medium but a different type of formatting.

4. An information transfer apparatus as claimed in claim 1, wherein said information transfer operation is controlled by a remote controller.

5. An information transfer apparatus as claimed in claim 1, further comprising:

a selecting device configured to select one or more information recording and reproducing apparatuses as information transfer sources; and one or more the other information recording and reproducing apparatuses as information transfer destinations.

6. An information transfer apparatus as claimed in claim 5, wherein said selecting device selects one or more information recording and reproducing apparatuses in a prescribed priority order.

7. An information transfer apparatus as claimed in claim 6, wherein said priority is given to a most frequently utilized information recording and reproducing apparatus as an information transfer source.

8. An information transfer apparatus as claimed in claim 5, further comprising a first recording medium existence determining device configured to determine if a recording medium having information to be transferred exists in the information recording and reproducing apparatus of the information transfer source.

9. An information transfer apparatus as claimed in claim 5, further comprising a second recording medium existence determining device configured to determine if a recording medium recording information therein exists in the information recording and reproducing apparatus of the information transfer destination.

10. An information transfer apparatus as claimed in any one of claims 8 or 9, further comprising a condition informing device configured to inform a condition if said recording medium does not exist.

11. An information transfer apparatus as claimed in claim 10, wherein said condition informing device includes a display and a speaker.

12. An information transfer apparatus as claimed in claim 11, further comprising: a device configured to notify completion of the information transfer operation.

13. An information transfer apparatus as claimed in claim 8, further comprising:

a replacement information device, said replacement information device being configured to notify the information recording and reproducing apparatus whether it includes the information transfer program.

14. An information transfer apparatus as claimed in claim 5, further comprising an information transfer completion determining device configured to determine completion of the information transfer operation.

15. An information transfer apparatus as claimed in claim 5, further comprising a plurality of ports configured to connect with a host computer, a printer, and another digital input/output instruments.

16. An information transfer method, comprising the steps of:

accommodating a controller and a variety of information recording and reproducing apparatuses in a casing, said variety of information recording and reproducing apparatuses including an optical disk, an optical magnetic disk, a magnetic disk, a memory card, and a magnetic tape;

selecting one or more information recording and reproducing apparatuses as information transfer sources;

selecting one or more information recording and reproducing apparatuses as information transfer destinations;

reading information from one or more information transfer sources;

transferring the information to one or more information transfer destinations;

controlling the information transfer operation using an information transfer program realizing an information transfer operation among the variety of information and reproducing apparatuses;

reading, by said controller, the information transfer program stored in a detachable recording medium included within at least one of said information recording and reproducing apparatuses; and controlling, by said controller, said steps of reading and transferring by executing said information transfer program.

* * * * *